US012679327B2

(12) United States Patent
Clements et al.

(10) Patent No.: US 12,679,327 B2
(45) Date of Patent: Jul. 14, 2026

(54) DYNAMIC BATTERY CHARGE STRATEGY UTILIZING CURRENT AND PREDICTED VEHICLE AND ENVIRONMENTAL CONDITIONS

(71) Applicant: HYLIION INC., Cedar Park, TX (US)

(72) Inventors: William Clements, Salado, TX (US); Moustapha Diab, Austin, TX (US)

(73) Assignee: Hyliion Inc., Cedar Park, TX (US)

( * ) Notice: Subject to any disclaimer, the term of this patent is extended or adjusted under 35 U.S.C. 154(b) by 399 days.

(21) Appl. No.: 18/353,474

(22) Filed: Jul. 17, 2023

(65) Prior Publication Data

US 2024/0034298 A1      Feb. 1, 2024

Related U.S. Application Data

(60) Provisional application No. 63/369,401, filed on Jul. 26, 2022.

(51) Int. Cl.
B60W 20/12          (2016.01)
B60K 6/40          (2007.10)
          (Continued)

(52) U.S. Cl.
CPC .............. B60W 20/12 (2016.01); B60K 6/40 (2013.01); B60W 10/08 (2013.01); B60W 20/14 (2016.01);
          (Continued)

(58) Field of Classification Search
CPC ......... B60K 6/48; B60W 10/06; B60W 10/08; B60W 20/12; B60W 20/14; B60W 20/15;
          (Continued)

(56) References Cited

U.S. PATENT DOCUMENTS

2007/0112475 A1    5/2007  Koebler et al.
2018/0093655 A1    4/2018  Healy et al.
          (Continued)

FOREIGN PATENT DOCUMENTS

CN          109910866 A      6/2019
DE          102019112651      12/2019
          (Continued)

OTHER PUBLICATIONS

International Searching Authority, International Search Report and Written Opinion for International Application No. PCT/US2023/027895, mailed Nov. 1, 2023, 16 pages.
          (Continued)

*Primary Examiner* — Wade Miles
*Assistant Examiner* — Zachary Joseph Wallace
(74) *Attorney, Agent, or Firm* — Baker Botts L.L.P.

(57) ABSTRACT

Systems and methods of providing traction assistance in a vehicle are disclosed that include determining whether a slip condition exists on a route of the vehicle based on vehicle data, external data, or a combination thereof, determining an electric drive powertrain configuration that includes a minimum state of charge (SoC) for a battery system of the vehicle based on the slip condition, and communicating the electric drive powertrain configuration to an electric drive powertrain controller, which operates the electric drive powertrain in accordance with the electric drive powertrain configuration to provide the minimum SoC to the battery system prior to the vehicle travelling over a portion of the route where the slip condition exists.

60 Claims, 4 Drawing Sheets

(51) Int. Cl.

| | | |
|---|---|---|
| *B60W 10/08* | (2006.01) | |
| *B60W 20/14* | (2016.01) | |
| *B60W 30/18* | (2012.01) | |

(52) U.S. Cl.

CPC . *B60W 30/18127* (2013.01); *B60W 2510/244* (2013.01); *B60W 2520/10* (2013.01); *B60W 2530/10* (2013.01); *B60W 2552/15* (2020.02); *B60W 2555/20* (2020.02); *B60W 2556/10* (2020.02); *B60W 2556/45* (2020.02); *B60W 2710/242* (2013.01); *B60Y 2200/92* (2013.01)

(58) Field of Classification Search

CPC ....... B60W 2300/12; B60W 2510/244; B60W 2520/10; B60W 2530/10; B60W 2552/15; B60W 2555/20; B60W 2556/10; B60W 2556/45; B60W 2710/242; B60W 2720/403; B60W 30/18127; B60W 30/18172; B60W 50/0097

See application file for complete search history.

(56)  References Cited

U.S. PATENT DOCUMENTS

| | | | | |
|---|---|---|---|---|
| 2018/0361856 A1* | 12/2018 | Zhao | ..................... | B60W 10/02 |
| 2019/0291712 A1 | 9/2019 | Symanow et al. | | |
| 2021/0215493 A1 | 7/2021 | Kapadia et al. | | |
| 2022/0316896 A1* | 10/2022 | Umeda | ................ | B60W 40/06 |

FOREIGN PATENT DOCUMENTS

| | | |
|---|---|---|
| JP | 2013-052693 A | 3/2013 |
| KR | 1020080053561 A | 6/2008 |

OTHER PUBLICATIONS

Sun Hwa Lee, International Preliminary Report on Patentability, Application No. PCT/US2023/027895, dated Feb. 6, 2025, 10 pages, pub. by, International Bureau of WIPO, Geneva, Switzerland.

\* cited by examiner

200

Vehicle Data:
Route Start: Start

Location A Grade:     0%

Location B Grade     10%

Location C Grade:    -3%

Route End: End

External Data

Tire Tread Depth:         90%

Location A Weather:   Rainy

Location B Slip:            Yes (Weather: Icy)
Location B Weather:   Clear
Location B Slip:            No Location C Weather:   Snowy

≥ 50%          ≥ 90%          ≥ 70%

A          B          C          End

DYNAMIC BATTERY CHARGE STRATEGY UTILIZING CURRENT AND PREDICTED VEHICLE AND ENVIRONMENTAL CONDITIONS

BENEFIT CLAIM

This application claims the benefit under 35 U.S.C. 119(e) of provisional application 63/369,401, filed Jul. 26, 2022, the entire contents of which are hereby incorporated by reference for all purposes as if fully set forth herein.

TECHNICAL FIELD

One technical field is computer-implemented predictive traction control of land vehicles. Another technical field is server-client control, via wireless networking, of the operating parameters of vehicles, including hybrid drive vehicles.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Vehicles often encounter many different types of road conditions, terrain, and/or weather. Certain conditions, such as loose gravel pavement, steep grades, sharp turns, and/or wet or icy road conditions, may impact the traction of the vehicle and increase the likelihood that the vehicle experiences a slip condition or loss of traction. Characteristics of the vehicle, such as load, power and torque output, tire condition, and/or weight, may also impact the likelihood that the vehicle experiences a slip condition or loss of traction when certain conditions are present. Current slip or traction control systems recognize when a vehicle experiences a slip condition or loss of traction and adjusts the power output of the vehicle to attempt to regain proper traction. However, these systems are merely reactive to the slip condition or loss of traction and do not predict or prepare an electric drive powertrain to assist in future slip conditions or loss of traction.

BRIEF DESCRIPTION OF THE DRAWINGS

For a more complete understanding of the present disclosure and so that the features and advantages of the embodiments can be understood in more detail, reference is now made to the following brief description, taken in connection with the accompanying drawings and detailed description.

DETAILED DESCRIPTION

1. Overview

Figure 1:
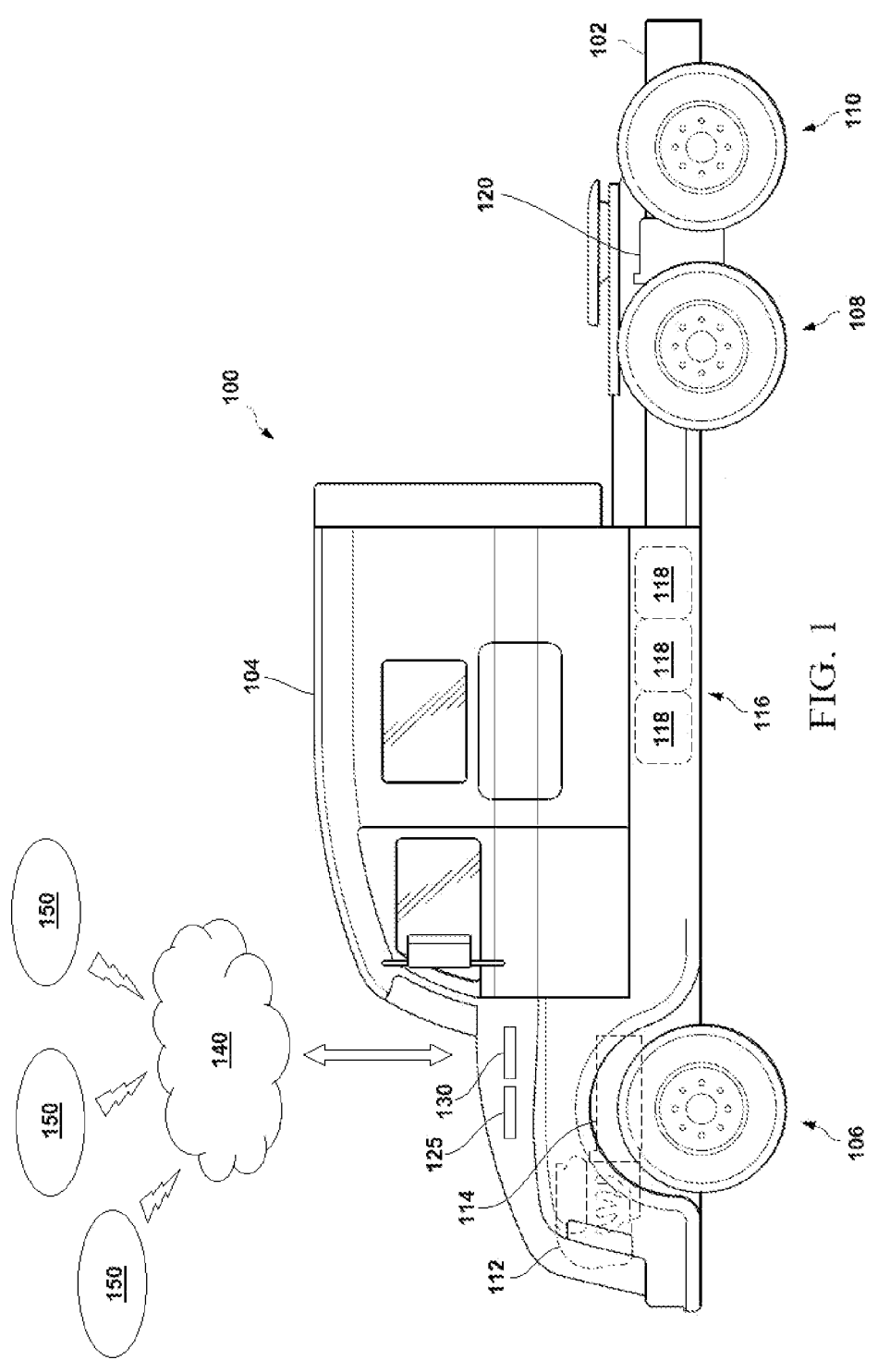
FIG. 1 shows a schematic side view of a vehicle according to an embodiment of the disclosure.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

2. Structural and Functional Description 2.1 Vehicle, Electric Drive Powertrain Controller, the Cloud Computing System FIG. 1 shows a schematic side view of a vehicle according to an embodiment of the disclosure. In an embodiment, the system described herein comprises components implemented partially by hardware at one or more computing devices, such as one or more hardware processors executing stored program instructions stored in one or more memories for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of computer-implemented predictive traction control of land vehicles. Another technical field is server-client control, via wireless networking, of the operating parameters of vehicles, including hybrid drive vehicles. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

In some embodiments, vehicle 100 may comprise a truck or a truck/trailer combination and comprise a chassis 102 comprising a plurality of frame rails, a cab 104 supported by the chassis 102, a front wheeled steering axle 106 coupled to the chassis 102, a first (primary) drive axle 108 coupled to the chassis 102, and a second (electric) drive axle 110 coupled to the chassis 102. Vehicle 100 may also comprise a primary powertrain comprising a fuel-fed engine 112 coupled to the first drive axle 108 through a transmission 114. In this configuration, the fuel-fed engine may be configured to selectively burn one or more fuels to generate and provide a motive torque through the transmission 114 to the first drive axle 108 to propel the vehicle 100 over a route. In some embodiments, the fuel-fed engine 112 may comprise a combustion engine configured to burn natural gas, diesel, hydrogen, liquified petroleum gas, or any combination thereof. However, in alternative embodiments, the primary powertrain may comprise a hydrogen fuel cell.

Vehicle 100 may also comprise an electric drive powertrain comprising a battery system 116 comprising one or more battery packs 118 and coupled to the electric drive axle 110 through a motor/generator (M/G) 120. In this configuration, the battery system 116 may be configured to supply electrical power from one or more battery packs 118 to the M/G 120 to provide a motive torque to the electric drive axle 110 to propel the vehicle 100 over a route. Further, in some embodiments, the battery system 116 may also receive electrical power generated by the M/G 120 through the electric drive axle 110 in a regenerative braking mode to charge one or more battery packs 118 of the battery system 116. One or more battery packs 118 may be configured to store electrical power and deliver the electrical power to the M/G 120 upon demand. One or more battery packs 118 may be electrically coupled in parallel, series, or a combination depending on the application, configuration, and/or voltage requirements of the components or systems to which the battery system 116 may provide electrical power.

Vehicle 100 may also comprise a primary system controller 125. In some embodiments, the primary system controller 125 may control the operation of vehicle 100. In some embodiments, the primary system controller 125 may comprise an electronic control unit (ECU) and be configured to execute instructions to control the primary powertrain (e.g., fuel-fed engine 112, transmission 114, and first drive axle 108) of vehicle 100. In some embodiments, the primary powertrain may be configured to generate and provide motive torque to the first drive axle 108 to propel the vehicle 100 over a route. In some embodiments, the primary powertrain may be independently operable from the electric drive powertrain to propel the vehicle 100 over the route.

The vehicle 100 may also comprise an electric drive powertrain controller 130. In some embodiments, the electric drive powertrain controller 130 may be configured to collect vehicle data and control the operation of the electric drive powertrain (e.g., the battery system 116, M/G 120, and electric drive axle 110) of vehicle 100. In some embodiments, the electric drive powertrain controller 130 may be configured to selectively control an amount of the electrical power supplied from the battery system 116 to control the operation of the electric drive powertrain. The electric drive powertrain may be independently operable from the primary powertrain to propel the vehicle 100 over the route. However, the electric drive powertrain may also be operated simultaneously with the primary powertrain to propel the vehicle 100 over the route. In some embodiments, the electric drive powertrain controller 130 may be communicatively coupled to the primary system controller 125.

In some embodiments, the electric drive powertrain controller 130 may be configured to collect vehicle data from vehicle 100, the primary system controller 125, and/or user inputs made through a user interface in vehicle 100. In some embodiments, the vehicle data may comprise the location of vehicle 100, the speed of vehicle 100, load information of vehicle 100, the route of vehicle 100, one or more previous slip events of vehicle 100, the vehicle data associated with the one or more previous slip events of the vehicle 100, a time of operation of the vehicle 100, a state of charge (SoC)

of the battery system 116 of the vehicle 100, a grade of the road on which the vehicle 100 is traveling, or any combination thereof.

In some embodiments, the electric drive powertrain controller 130 may comprise a controller area network ("CAN BUS") or other communication means for communicating the vehicle data wirelessly over a network with an external network system or cloud computing system 140 (the "cloud"). In some embodiments, the electric drive powertrain controller 130 may be configured to communicate the vehicle data continuously to the cloud computing system 140.

2.2 Predictive Determination of Slip Conditions

The cloud computing system 140 may generally be connected in wireless communication with the electric drive powertrain controller 130 and be configured to wirelessly receive the vehicle data from the electric drive powertrain controller 130. In some embodiments, the cloud computing system 140 may also be connected in wireless communication with and be configured to selectively receive external data from one or more external data sources 150. In some embodiments, the external data may comprise tire information (e.g., tread depth, tire size, tire type, etc.) of vehicle 100, load information of vehicle 100, previous slip data for vehicle 100, previous slip data for other vehicles, previous slip data for other similar vehicles, a grade of each portion of the route of the vehicle 100, a grade of each portion of the route of the vehicle 100 that exceeds a predetermined grade threshold, road conditions of the route of the vehicle 100, weather data associated with the route of the vehicle 100, or any combination thereof. In some embodiments, the cloud computing system 140 may comprise a private external server configured to collect and store the vehicle data and the external data for a plurality of vehicles. Further, the cloud computing system 140 may be configured to determine whether a slip condition exists for vehicle 100 based on the vehicle data and/or the external data. The cloud computing system 140 may also be configured to determine an electric drive powertrain configuration for vehicle 100 based on the slip condition prediction for vehicle 100.

In operation, vehicle 100 may be configured to determine whether a slip condition exists along a route of vehicle 100 and determine and/or predict the likelihood of a loss of traction of vehicle 100. The electric drive powertrain controller 130 may collect vehicle data from vehicle 100, the primary system controller 125, and/or user inputs made through a user interface in vehicle 100. In some embodiments, the vehicle data may be communicated from the electric drive powertrain controller 130 to the cloud computing system 140. The cloud computing system 140 may also receive external data from one or more external data sources 150. The cloud computing system 140 may be programmed to determine whether a slip condition exists on a route of vehicle 100 based on the vehicle data, the external data, or a combination thereof. More specifically, the cloud computing system 140 may be programmed to determine whether the slip condition exists by analyzing the vehicle data, the external data, or a combination thereof and predicting the likelihood that vehicle 100 will slip or lose traction over the route.

In some embodiments, the cloud computing system 140 may be programmed to determine a slip condition exists when a condition or a combination of conditions in the vehicle data, the external data, or a combination thereof exists that increases the likelihood that vehicle 100 will slip or lose traction over the route. In some embodiments, the cloud computing system 140 may be programmed to determine a slip condition exists when a condition or a combination of conditions in the vehicle data, the external data, or a combination thereof exists that increases the likelihood that the vehicle may slip or lose traction over the route when the vehicle 100 is propelled by the primary powertrain. In some embodiments, the cloud computing system 140 may be programmed to determine a slip condition exists when a condition or a combination of conditions in the vehicle data, the external data, or a combination thereof exists that increases the likelihood that the vehicle will require the operation of the electric drive powertrain in conjunction with the primary powertrain to maintain traction of the vehicle 100 over the route. For example, if the vehicle data comprises a route with a steep incline, the external data shows precipitation on a portion of the route, and the external data further shows that the tire tread of the vehicle is below 50%, then the cloud computing system 140 may be programmed to determine a slip condition exists on the portion of the route where there is precipitation and/or on the portion of the route where there is the steep incline but without precipitation.

Once the cloud computing system 140 has determined a slip condition exists on the route of vehicle 100, the cloud computing system 140 may be programmed to determine an electric drive powertrain configuration for vehicle 100 based on the slip condition. In some embodiments, the electric drive powertrain configuration for vehicle 100 may comprise a minimum state of charge (SoC) for the battery system 116. In some embodiments, the electric drive powertrain configuration for vehicle 100 may comprise a minimum state of charge (SoC) for the battery system 116 prior to the vehicle traveling over a portion of the route where the slip condition exists. In some embodiments, the electric drive powertrain configuration for vehicle 100 may comprise a minimum state of charge (SoC) for the battery system 116 that ensures sufficient electrical power from the battery system 116 is available to power the electric drive powertrain to provide traction assist to the primary powertrain over the portion of the route where the slip condition exists.

Further, in some embodiments, the cloud computing system 140 may be programmed to determine one or more locations along the route of vehicle 100 where the slip condition exists. In some embodiments, one or more locations may comprise one or more segments of the route, one or more global positioning system (GPS) locations, and/or one or more regions.

In some embodiments, the cloud computing system 140 may be programmed to determine an electric drive powertrain configuration for vehicle 100 for each of the one or more locations along the route where a slip condition exists. In some embodiments, the electric drive powertrain configuration for vehicle 100 may comprise a minimum state of charge (SoC) for the battery system 116 for each of the one or more locations along the route where a slip condition exists. In some embodiments, the electric drive powertrain configuration for vehicle 100 may comprise a minimum state of charge (SoC) for the battery system 116 prior to the vehicle traveling each of the one or more locations on the route where a slip condition exists. In some embodiments, the electric drive powertrain configuration for vehicle 100 may comprise a minimum state of charge (SoC) for the battery system 116 that ensures sufficient electrical power from the battery system 116 is available to power the electric drive powertrain to provide traction assist to the primary powertrain over the one or more locations on the route where the slip condition exists.

The cloud computing system 140 may be programmed to communicate the electric drive powertrain configuration to the electric drive powertrain controller 130. In response to receiving the configuration from the cloud computing system 140, the electric drive powertrain controller 130 may be programmed to operate the electric drive powertrain in accordance with the electric drive powertrain configuration. In some embodiments, the electric drive powertrain controller 130 may be programmed to operate the vehicle in accordance with the electric drive powertrain configuration to provide the battery system 116 with a minimum state of charge (SoC) prior to the vehicle 100 traveling over the portion of the route where the slip condition exists. In some embodiments, the minimum state of charge (SoC) for the battery system 116 allows the vehicle to operate the electric drive powertrain in response to the vehicle experiencing a loss of traction over the portion of the route where the slip condition exists. In some embodiments, the minimum state of charge (SoC) for the battery system 116 allows the vehicle to continuously operate the electric drive powertrain over the portion of the route where the slip condition exists. Accordingly, the minimum state of charge (SoC) for the battery system 116 may be proportionate to the condition or combination of conditions present over route that increase the likelihood that vehicle 100 may experience a slip condition or loss of traction.

In some embodiments, the electric drive powertrain controller 130 and the cloud computing system 140 may be programmed to continuously communicate to update the electric drive powertrain configuration based on changes in the vehicle data, the external data, or a combination thereof. Further, in some embodiments, the electric drive powertrain controller 130 and the cloud computing system 140 may be programmed to continuously communicate to update the electric drive powertrain configuration based on changes in the route of the vehicle.

In alternative embodiments, the electric drive powertrain controller 130 may determine, locally on vehicle 100 instead of remotely in the cloud computing system 140, whether a slip condition exists on the route of vehicle 100. Accordingly, the electric drive powertrain controller 130 may be programmed to collect vehicle data from vehicle 100, the primary system controller 125, and/or user inputs made through a user interface in vehicle 100 and may also receive external data from one or more external data sources 150. In some embodiments, the external data sources 150 from one or more power sources may be communicated to the electric drive powertrain controller 130 through the cloud computing system 140. The electric drive powertrain controller 130 may be programmed to determine whether a slip condition exists on the route of vehicle 100 by analyzing the vehicle data, the external data, or a combination thereof and predicting a likelihood that vehicle 100 will slip or lose traction over the route. Further, the electric drive powertrain controller 130 may also determine an electric drive powertrain configuration for the vehicle based on the slip condition and operate the electric drive powertrain in accordance with the electric drive powertrain configuration to provide the battery system 116 with a minimum state of charge (SoC) in accordance with embodiments disclosed herein.

The slip condition prediction system disclosed herein provides advanced analytics associated with the vehicle. The advanced analytics allows the electric drive powertrain controller to operate the electric drive powertrain to maximize fuel efficiency and/or power assist while reserving an optimal state of charge (SoC) in the battery system 116 for traction control over portions of a route where a predicted slip condition exists. This becomes a delicate balancing act in maximizing fuel economy and power assist while reserving enough electrical power in the battery system 116 for traction assist with the electric drive powertrain. If vehicle 100 were to constantly operate to achieve maximum fuel efficiency or for maximum power assist, vehicle 100 might not have enough reserve electrical power to provide traction control with the electric drive powertrain over portions of a route where a slip condition exists. This may increase the likelihood of vehicle 100 losing traction and potentially causing a collision.

Accordingly, by executing a look ahead algorithm that analyzes the route of vehicle 100 and identifies slip conditions along the route based on the principles previously described, the electric drive powertrain controller 130 may be programmed to cause vehicle 100 to operate to achieve maximum fuel efficiency over portions of a route where no slip conditions exist while reserving appropriate electrical power in the battery system 116 so that the electric drive powertrain may be operated to provide traction control to the primary powertrain over portions of the route where a slip condition exists. In some embodiments, electric drive powertrain controller 130 may be programmed to cause vehicle 100 to operate continuously over the portion of the route where the slip condition exists to provide traction control to the primary powertrain. Because the operation of the electric drive powertrain is limited by the state of charge (SoC) of the battery system 116, the electric drive powertrain controller 130 and the cloud computing system 140 may be programmed using the look-ahead algorithm for slip condition prediction to plan ahead and provide a sufficient state of charge (SoC) for the battery system 116 for all portions of the route where a slip condition exists. This allows vehicle 100 to operate the electric drive powertrain over the portions of the route where a slip condition exists without experiencing range anxiety or loss of power to ensure maximum traction of vehicle 100.

2.3 Example of Slip Condition Prediction

Figure 2:
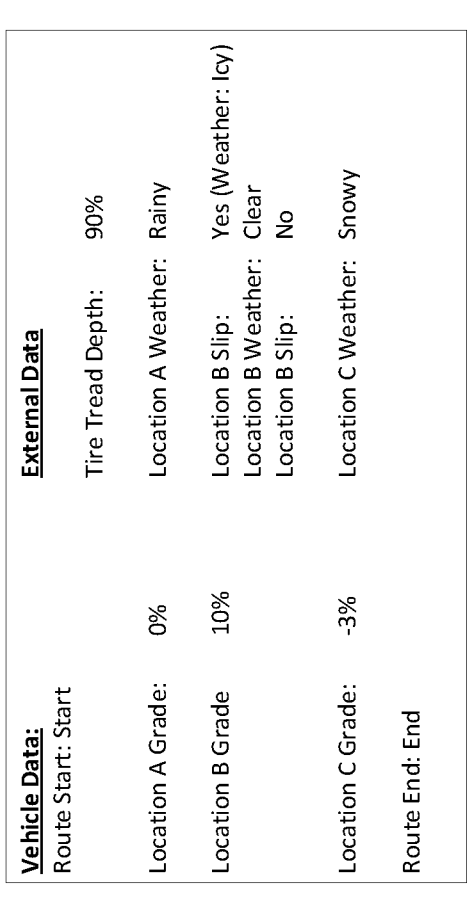
FIG. 2 shows a schematic diagram of a slip condition prediction for a route of a vehicle according to an embodiment of the disclosure.
Figure 2:
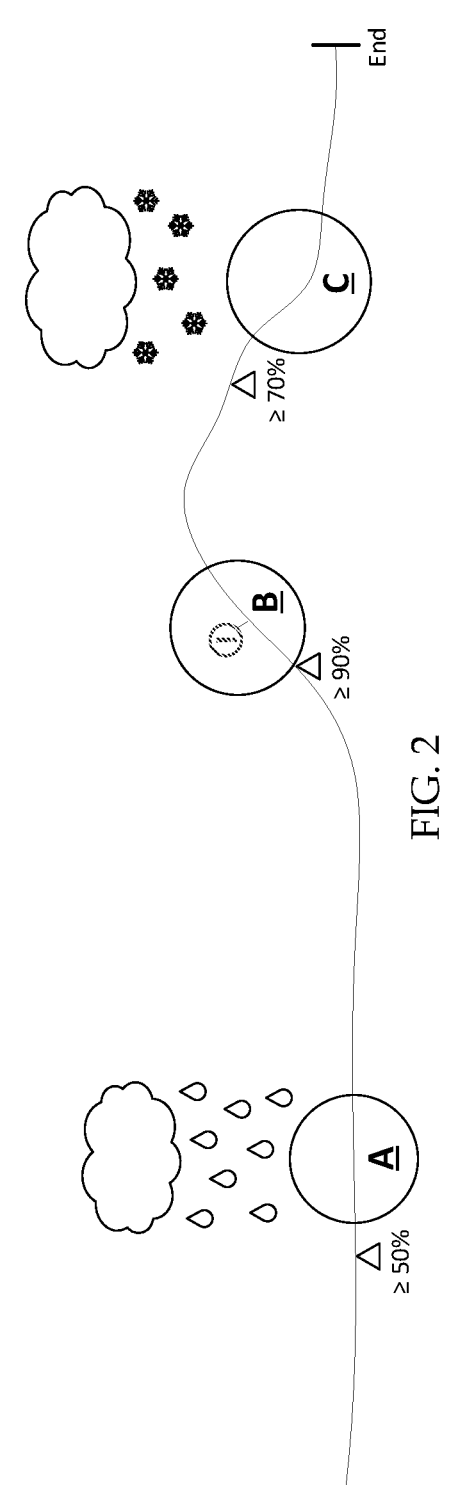

FIG. 2 shows a schematic diagram of a slip condition prediction for a route of a vehicle according to an embodiment. In an embodiment, the electric drive powertrain controller 130 or the cloud computing system 140 may be programmed according to a slip condition prediction 200 to determine a slip condition exists when a condition or a combination of conditions in the vehicle data and/or the external data exists that increases a likelihood that the vehicle 100 will slip or lose traction over the route.

In the example of FIG. 2, the vehicle data comprises a route of vehicle 100 having a Route Start ("Start") and a Route End ("End"). The external data comprises the tire tread depth of 90% (gathered at the last maintenance check), weather data along the route, and previous slip data along the route. In response, the electric drive powertrain controller 130 or the cloud computing system 140 may be programmed to determine three example slip conditions to exist on the route: A, B, and C.

Slip condition A comprises a relatively flat road grade but also includes rainy weather conditions. Slip condition B comprises a 10% uphill grade, clear weather, and historical data from a previous slip event for vehicle 100 when the weather conditions were icy. Slip condition C comprises a −3% downhill grade and snowy weather conditions. In analyzing the route of vehicle 100, the weather conditions along the route, and the tread depth of the tires of vehicle 100, the electric drive powertrain controller 130 or the cloud computing system 140 may determine that slip conditions A, B, and C exists along the route of the vehicle 100 based on the conditions that increase a likelihood the vehicle 100 will slip along the route.

Accordingly, the electric drive powertrain controller 130 or the cloud computing system 140 may determine an electric drive powertrain configuration for vehicle 100 based on the slip conditions A, B, and C. The electric drive powertrain configuration in this example may include: a minimum state of charge (SoC) for battery system 116 of 50% for the battery system 116 prior to entering location A; a minimum SoC for the battery system 116 of 90% for the battery system 116 prior to entering location B; and a minimum SoC for the battery system 116 of 70% for the battery system 116 prior to entering location C. Because slip condition A comprises a relatively flat grade and some rain, the minimum SoC is determined to be 50%. Because slip condition B comprises a steep uphill grade and a previous slip condition occurred at this location, the minimum SoC is determined to be 90%. Although slip condition C comprises a downhill grade, the snowy weather conditions drastically increase the likelihood of a slip event, so the minimum SoC is determined to be 70%. Accordingly, it will be appreciated that the conditions in the vehicle data and external data that increase the likelihood that vehicle 100 may slip or lose traction over the route may be weighed by the algorithm executed by the electric drive powertrain controller 130 or the cloud computing system 140 to determine the minimum SoC needed for the battery system 116 for each location on the route where a slip condition occurs. This may ensure that vehicle 100 can operate the electric drive powertrain over the portions of the route where a slip condition exists without experiencing range anxiety or loss of power to ensure maximum traction of vehicle 100.

2.4 Example Method of Operating a Vehicle

Figure 3:
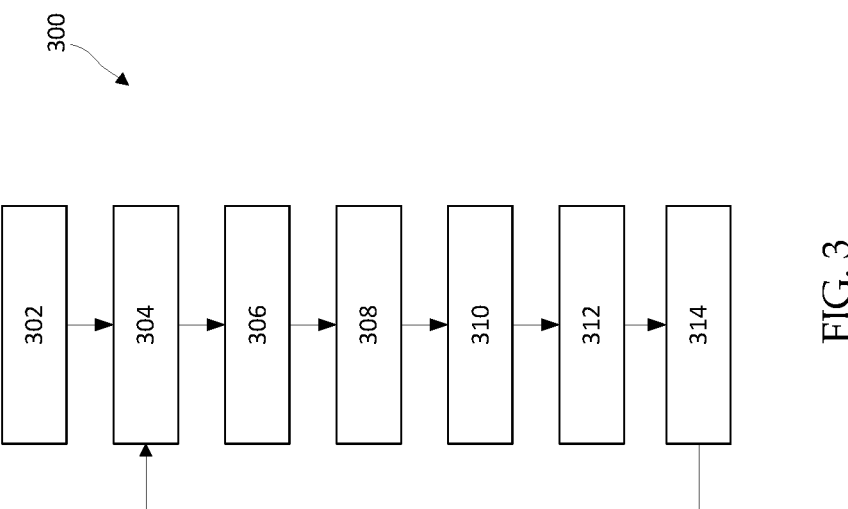
FIG. 3 shows a flowchart of a method of operating a vehicle according to an embodiment of the disclosure.

FIG. 3 shows a flowchart of a method of operating a vehicle according to an embodiment. FIG. 3 and each other flow diagram herein are intended as an illustration of the functional level at which skilled persons, in the art to which this disclosure pertains, communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

In one embodiment, a method 300 is programmed at block 302 by providing a vehicle 100 comprising a primary powertrain comprising a fuel-fed engine 112 coupled to a first drive axle 108, an electric drive powertrain comprising a battery system 116 coupled to an electric drive axle 110, and an electric drive powertrain controller 130 configured to control operation of the electric drive powertrain.

The method 300 is programmed at block 304 by collecting vehicle data with the electric drive powertrain controller 130. The method 300 is programmed at block 306 by selectively receiving external data from one or more external data sources 150. The method 300 is programmed at block 308 by determining whether a slip condition exists on a route of vehicle 100 based on the vehicle data, the external data, or a combination thereof. In some embodiments, determining whether the slip condition exists comprises analyzing the vehicle data, the external data, or a combination thereof and predicting the likelihood that vehicle 100 will slip or lose traction over the route.

The method 300 is programmed at block 310 by determining an electric drive powertrain configuration for vehicle 100 based on the slip condition. In some embodiments, the electric drive powertrain configuration for vehicle 100 may comprise a minimum state of charge (SoC) for the battery system 116 prior to the vehicle traveling over a portion of the route where the slip condition exists. In some embodiments, the electric drive powertrain configuration for vehicle 100 may comprise a minimum state of charge (SoC) for the battery system 116 that ensures sufficient electrical power from the battery system 116 is available to power the electric drive powertrain to provide traction assist to the primary powertrain over the portion of the route where the slip condition exists. The method 300 is programmed at block 312 by communicating the electric drive powertrain configuration to the electric drive powertrain controller 130.

The method 300 is programmed at block 314 by operating the electric drive powertrain in accordance with the electric drive powertrain configuration. The method 300 is programmed to continuously repeat as vehicle 100 travels over the route in response to changes in the route and/or in response to changes in the conditions in the vehicle data, the external data, or a combination thereof.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
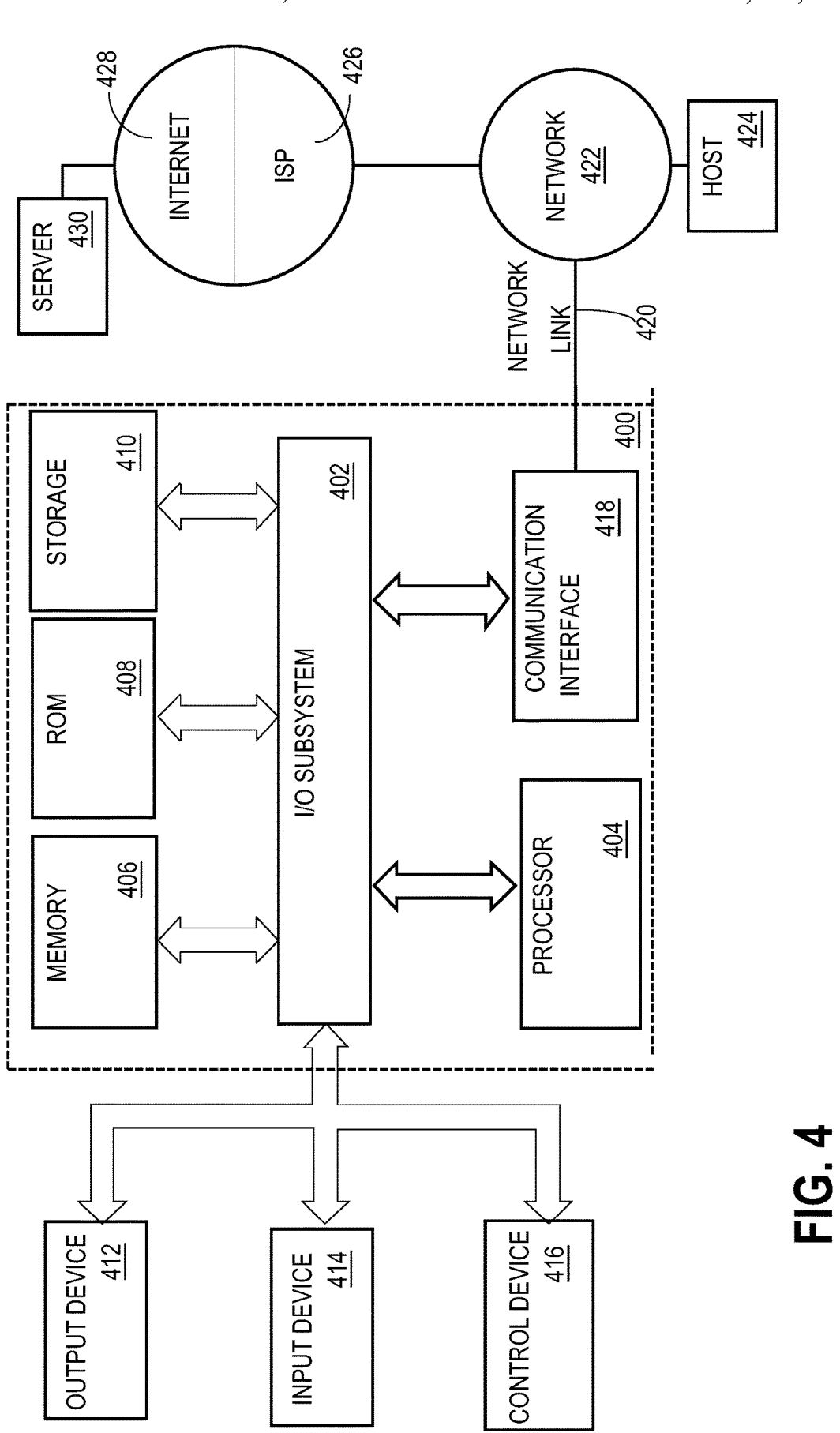
FIG. 4 illustrates a distributed computer system with which one embodiment could be implemented.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 400 includes an input/output (I/O) subsystem 402, which may include a bus and/or other communication mechanism(s) for communicating information and/or instructions between the components of the computer system 400 over electronic signal paths. The I/O subsystem 402 may include an I/O controller, a memory controller, and at least one I/O port. The electronic signal paths are represented schematically in the drawings, such as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU), or a digital signal processor or ARM processor. Processor 404 may comprise an integrated arithmetic logic unit (ALU) or be coupled to a separate ALU.

Computer system 400 includes one or more units of memory 406, such as a main memory, coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during the execution of instructions to be executed by processor 404. Such instructions, when stored in non-transitory computer-readable storage media accessible to processor 404, can render computer system 400 into a special-purpose machine customized to perform the operations specified in the instructions.

Computer system 400 includes non-volatile memory such as read-only memory (ROM) 408 or other static storage devices coupled to I/O subsystem 402 for storing information and instructions for processor 404. The ROM 408 may include various forms of programmable ROM (PROM), such as erasable PROM (EPROM) or electrically erasable PROM (EEPROM). A unit of persistent storage 410 may include various forms of non-volatile RAM (NVRAM), such as FLASH memory, solid-state storage, magnetic disk, or optical disks such as CD-ROM or DVD-ROM and may be coupled to I/O subsystem 402 for storing information and instructions. Storage 410 is an example of a non-transitory computer-readable medium that may be used to store instructions and data which, when executed by the processor 404, cause performing computer-implemented methods to execute the techniques herein.

The instructions in memory 406, ROM 408, or storage 410 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 400 may be coupled via I/O subsystem 402 to at least one output device 412. In one embodiment, output device 412 is a digital computer display. Examples of a display that may be used in various embodiments include a touchscreen display, a light-emitting diode (LED) display, a liquid crystal display (LCD), or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections, or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. The control device 416 may be a touchpad, a mouse, a trackball, or cursor direction keys for communicating direction information and command selections to processor 404 and for controlling cursor movement on an output device 412, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 414 may include a combination of multiple input devices, such as a video camera and a depth sensor.

In another embodiment, computer system 400 may comprise an Internet of Things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders, and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware, and interfaces for generating position reporting packets, notifications, pulse or heartbeat signals, or other recurring data transmissions that specify a position of the computer system 400, alone or in combination with other application-specific data, directed toward host computer 424 or server computer 430.

Computer system 400 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 402. Transmission media can also be acoustic or light waves generated during radio-wave and infrared data communications.

Various forms of media may carry at least one sequence of at least one instruction to processor 404 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to a bus or I/O subsystem 502. Communication interface 418 provides a two-way data communication coupling to a network link(s) 420 directly or indirectly connected to at least one communication network, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 422 broadly represents a local area network (LAN), wide-area network (WAN), campus network, internetwork, or any combination thereof. Communication interface 418 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic, or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may connect through network 422 to a host computer 424.

Furthermore, network link 420 may connect through network 422 or to other computing devices via internetworking devices and/or computers operated by an Internet Service Provider (ISP) 426. ISP 426 provides data communication services through a worldwide packet data communication network called Internet 428. A server computer 430 may be coupled to Internet 428. Server computer 430 broadly represents any computer, data center, virtual machine, or virtual computing instance with or without a hypervisor, or computer executing a containerized program system such as DOCKER or KUBERNETES. Server computer 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server computer 430 may form elements of a distributed computing system that includes other computers, a processing cluster, a server farm, or other organizations of computers that cooperate to perform tasks or execute applications or services. Server computer 430 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 430 may comprise a web application server that hosts a presentation layer, application layer, and data storage layer, such as a relational database system using a structured query language (SQL) or no SQL, an object store, a graph database, a flat file system or other data storage.

Computer system 400 can send messages and receive data and instructions, including program code, through the network(s), network link 420, and communication interface 418. In the Internet example, server computer 430 might transmit a requested code for an application program through Internet 428, ISP 426, local network 422, and communication interface 418. The received code may be executed by processor 404 as it is received and/or stored in storage 410 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

Embodiments of a vehicle 100, a slip condition prediction 200 system of a vehicle 100, and/or method 300 of operating a vehicle 100 may comprise one or more of the following embodiments:

Embodiment 1. A system, comprising: a vehicle comprising: a primary powertrain comprising a fuel-fed engine coupled to a primary drive axle; an electric drive powertrain comprising a battery system coupled to an electric drive axle; and an electric drive powertrain controller configured to collect vehicle data and control operation of the electric drive powertrain; and a cloud computing system connected in wireless communication with the electric drive system and one or more external data sources, wherein the cloud computing system is configured to: receive the vehicle data from the electric drive powertrain controller; selectively receive external data from the one or more external data sources; determine whether a slip condition exists on a route of the vehicle based on the vehicle data, the external data, or a combination thereof; determine an electric drive powertrain configuration for the vehicle based on the slip condition; and communicate the electric drive powertrain configuration to the electric drive powertrain controller; wherein the electric drive powertrain controller is configured to operate the electric drive powertrain in accordance with the electric drive powertrain configuration.

Embodiment 2. The system of embodiment 1, wherein the primary powertrain is configured to generate and provide motive torque to the primary drive axle to propel the vehicle over the route.

Embodiment 3. The system of any of embodiments 1 to 2, wherein the primary powertrain is independently operable from the electric drive powertrain to propel the vehicle over the route.

Embodiment 4. The system of any of embodiments 1 to 3, wherein the fuel-fed engine is coupled to the primary drive axle through a transmission.

Embodiment 5. The system of any of embodiments 1 to 4, wherein the fuel-fed engine is configured to burn compressed natural gas, diesel, hydrogen, liquified petroleum gas, or any combination thereof.

Embodiment 6. The system of any of embodiments 1 to 5, wherein the electric drive powertrain is configured to provide motive torque to the electric drive axle to propel the vehicle over the route.

Embodiment 7. The system of any of embodiments 1 to 6, wherein the electric drive powertrain is independently operable from the primary powertrain to propel the vehicle over the route.

Embodiment 8. The system of any of embodiments 1 to 7, wherein the battery system comprises one or more battery packs.

Embodiment 9. The system of any of embodiments 1 to 8, wherein the battery system is coupled to the electric drive axle through a motor/generator (M/G).

Embodiment 10. The system of embodiment 9, wherein the battery system is configured to selectively supply electrical power to the M/G to provide a motive torque to the electric drive axle to propel the vehicle over the route.

Embodiment 11. The system of embodiment 10, wherein the battery system is configured to selectively receive electrical power from the M/G in a regenerative braking mode and store the electrical power in the one or more battery packs.

Embodiment 12. The system of any of embodiments 1 to 11, wherein the electric drive powertrain controller is configured to collect the vehicle data from the vehicle, a primary system controller of the vehicle, user inputs through a user interface in the vehicle, or a combination thereof.

Embodiment 13. The system of any of embodiments 1 to 12, wherein the vehicle data comprises a location of the vehicle, a speed of the vehicle, load information of the vehicle, the route of the vehicle, one or more previous slip events of the vehicle, the vehicle data associated with the one or more previous slip events of the vehicle, a time of operation of the vehicle, a state of charge (SoC) of the battery system of the vehicle, a grade of road on which the vehicle is travelling, or a combination thereof.

Embodiment 14. The system of any of embodiments 1 to 13, wherein the electric drive powertrain controller is configured to communicate the vehicle data continuously to the cloud computing system.

Embodiment 15. The system of any of embodiments 1 to 14, wherein the electric drive powertrain controller is configured to selectively control an amount of the electrical power supplied from the battery system to control operation of the electric drive powertrain.

Embodiment 16. The system of any of embodiments 1 to 15, wherein the external data comprises tire information of the vehicle, load information of the vehicle, previous slip data for the vehicle, previous slip data for other vehicles, previous slip data for other similar vehicles, a grade of each portion of the route of the vehicle, a grade of each portion of the route of the vehicle that exceeds a predetermined grade threshold, road conditions of the route of the vehicle, weather data associated with the route of the vehicle, or any combination thereof.

Embodiment 17. The system of any of embodiments 1 to 16, wherein the cloud computing system comprises a private external server configured to collect and store the vehicle data and the external data for a plurality of vehicles.

Embodiment 18. The system of any of embodiments 1 to 17, wherein the cloud computing system is configured to determine whether the slip condition exists by analyzing the vehicle data, the external data, or a combination thereof and predicting a likelihood that the vehicle will slip or lose traction over the route.

Embodiment 19. The system of any of embodiments of 1 to 18, wherein the cloud computing system is configured to determine a slip condition exists when a condition or a combination of conditions in the vehicle data, the external data, or a combination thereof exists that increases a likelihood that the vehicle will slip or lose traction over the route.

Embodiment 20. The system of any of embodiments of 1 to 19, wherein the cloud computing system is configured to determine a slip condition exists when a condition or a combination of conditions in the vehicle data, the external data, or a combination thereof exists that increases a likelihood that the vehicle may slip or lose traction over the route when the vehicle is propelled by the primary powertrain.

Embodiment 21. The system of any of embodiments of 1 to 20, wherein the cloud computing system is configured to determine a slip condition exists when a condition or a combination of conditions in the vehicle data, the external data, or a combination thereof exists that increases a likelihood that the vehicle will require operation of the electric drive powertrain in conjunction with the primary powertrain to maintain traction of the vehicle over the route.

Embodiment 22. The system of any of embodiments 1 to 21, wherein the cloud computing system is configured to determine one or more locations along the route of the vehicle where the slip condition exists.

Embodiment 23. The system of embodiment 22, wherein the cloud computing system is configured to determine an electric drive powertrain configuration for the vehicle for each of the one or more locations.

Embodiment 24. The system of any of embodiments 1 to 23, wherein the electric drive powertrain configuration for the vehicle based on the slip condition comprises a minimum state of charge (SoC) for the battery system.

Embodiment 25. The system of any of embodiments 1 to 24, wherein the electric drive powertrain configuration for the vehicle based on the slip condition comprises a minimum state of charge (SoC) for the battery system prior to the vehicle travelling over a portion of the route where the slip condition exists.

Embodiment 26. The system of any of embodiments 1 to 25, wherein the electric drive powertrain configuration for the vehicle based on the slip condition comprises a minimum state of charge (SoC) for the battery system that ensures electrical power from the battery system is available to power the electric drive powertrain to provide traction assist to the primary powertrain over the portion of the route where the slip condition exists.

Embodiment 27. The system of any of embodiments 1 to 26, wherein the electric drive powertrain controller is configured to operate the vehicle in accordance with the electric drive powertrain configuration to provide the battery system with a minimum state of charge (SoC) prior to the vehicle travelling over the portion of the route where the slip condition exists.

Embodiment 28. The system of embodiment 27, wherein the minimum SoC for the battery system allows the vehicle to operate the electric drive powertrain in response to the vehicle experiencing a loss of traction over the portion of the route where the slip condition exists.

Embodiment 29. The system of any of embodiments 27 to 28, wherein the minimum SoC for the battery system allows the vehicle to continuously operate the electric drive powertrain over the portion of the route where the slip condition exists.

Embodiment 30. The system of any of embodiments 1 to 29, wherein the electric drive powertrain controller and the cloud computing system continuously communicate to update the electric drive powertrain configuration based on changes in the vehicle data, the external data, or a combination thereof.

Embodiment 31. The system of any of embodiments 1 to 30, wherein the electric drive powertrain controller and the cloud computing system continuously communicate to update the electric drive powertrain configuration based on changes in the route of the vehicle.

Embodiment 32. A method of operating a vehicle comprising a primary powertrain comprising a fuel-fed engine coupled to a primary drive axle, an electric drive powertrain comprising a battery system coupled to an electric drive axle, and an electric drive powertrain controller configured to control operation of the electric drive powertrain, comprising: collecting vehicle data with the electric drive powertrain controller; selectively receiving external data from one or more external data sources; determining whether a slip condition exists on a route of the vehicle based on the vehicle data, the external data, or a combination thereof; determining an electric drive powertrain configuration for the vehicle based on the slip condition; communicating the electric drive powertrain configuration to the electric drive powertrain controller; and operating the electric drive powertrain in accordance with the electric drive powertrain configuration.

Embodiment 33. The method of embodiment 32, wherein the primary powertrain is configured to generate and provide motive torque to the primary drive axle to propel the vehicle over the route.

Embodiment 34. The method of any of embodiments 32 to 33, wherein the primary powertrain is independently operable from the electric drive powertrain to propel the vehicle over the route.

Embodiment 35. The method of any of embodiments 32 to 34, wherein the fuel-fed engine is coupled to the primary drive axle through a transmission.

Embodiment 36. The method of any of embodiments 32 to 35, wherein the fuel-fed engine is configured to burn compressed natural gas, diesel, hydrogen, liquified petroleum gas, or any combination thereof.

Embodiment 37. The method of any of embodiments 32 to 36, wherein the electric drive powertrain is configured to provide motive torque to the electric drive axle to propel the vehicle over the route.

Embodiment 38. The method of any of embodiments 32 to 37, wherein the electric drive powertrain is independently operable from the primary powertrain to propel the vehicle over the route.

Embodiment 39. The method of any of embodiments 32 to 38, wherein the battery system comprises one or more battery packs.

Embodiment 40. The method of any of embodiments 32 to 39, wherein the battery system is coupled to the electric drive axle through a motor/generator (M/G).

Embodiment 41. The method of embodiment 40, wherein the battery system is configured to selectively supply electrical power to the M/G to provide a motive torque to the electric drive axle to propel the vehicle over the route.

Embodiment 42. The method of embodiment 41, wherein the battery system is configured to selectively receive electrical power from the M/G in a regenerative braking mode and store the electrical power in the one or more battery packs.

Embodiment 43. The method of any of embodiments 32 to 42, wherein the electric drive powertrain controller is configured to collect the vehicle data from the vehicle, a primary system controller of the vehicle, user inputs through a user interface in the vehicle, or a combination thereof.

Embodiment 44. The method of any of embodiments 32 to 43, wherein the vehicle data comprises a location of the vehicle, a speed of the vehicle, load information of the vehicle, the route of the vehicle, one or more previous slip events of the vehicle, the vehicle data associated with the one or more previous slip events of the vehicle, a time of operation of the vehicle, a state of charge (SoC) of the battery system of the vehicle, a grade of road on which the vehicle is travelling, or a combination thereof.

Embodiment 45. The method of any of embodiments 32 to 44, wherein the electric drive powertrain controller is configured to communicate the vehicle data to a cloud computing system.

Embodiment 46. The method of any of embodiments 32 to 45, wherein the electric drive powertrain controller is configured to selectively control an amount of the electrical power supplied from the battery system to control operation of the electric drive powertrain.

Embodiment 47. The method of any of embodiments 32 to 46, wherein the external data comprises tire information of the vehicle, load information of the vehicle, previous slip data for the vehicle, previous slip data for other vehicles, previous slip data for other similar vehicles, a grade of each portion of the route of the vehicle, a grade of each portion of the route of the vehicle that exceeds a predetermined grade threshold, road conditions of the route of the vehicle, weather data associated with the route of the vehicle, or any combination thereof.

Embodiment 48. The method of any of embodiments 32 to 47, wherein a cloud computing system selectively receives the external data from the one or more external data sources.

Embodiment 49. The method of any of embodiments 32 to 48, wherein determining whether the slip condition exists comprises analyzing the vehicle data, the external data, or a combination thereof and predicting a likelihood that the vehicle will slip or lose traction over the route.

Embodiment 50. The method of any of embodiments of 32 to 49, wherein a slip condition exists when a condition or a combination of conditions in the vehicle data, the external data, or a combination thereof exists that increases a likelihood that the vehicle will slip or lose traction over the route.

Embodiment 51. The method of any of embodiments of 32 to 50, wherein a slip condition exists when a condition or a combination of conditions in the vehicle data, the external data, or a combination thereof exists that increases a likelihood that the vehicle may slip or lose traction over the route when the vehicle is propelled by the primary powertrain.

Embodiment 52. The method of any of embodiments of 32 to 51, wherein a slip condition exists when a condition or a combination of conditions in the vehicle data, the external data, or a combination thereof exists that increases a likelihood that the vehicle will require operation of the electric drive powertrain in conjunction with the primary powertrain to maintain traction of the vehicle over the route.

Embodiment 53. The method of any of embodiments 32 to 52, further comprising: determining one or more locations along the route of the vehicle where the slip condition exists.

Embodiment 54. The method of embodiment 53, further comprising: determining an electric drive powertrain configuration for the vehicle for each of the one or more locations.

Embodiment 55. The method of any of embodiments 32 to 54, wherein the electric drive powertrain configuration for the vehicle based on the slip condition comprises a minimum state of charge (SoC) for the battery system.

Embodiment 56. The method of any of embodiments 32 to 55, wherein the electric drive powertrain configuration for the vehicle based on the slip condition comprises a minimum state of charge (SoC) for the battery system prior to the vehicle travelling over a portion of the route where the slip condition exists.

Embodiment 57. The method of any of embodiments 32 to 56, wherein the electric drive powertrain configuration for the vehicle based on the slip condition comprises a minimum state of charge (SoC) for the battery system that ensures electrical power from the battery system is available to power the electric drive powertrain to provide traction assist to the primary powertrain over the portion of the route where the slip condition exists.

Embodiment 58. The method of any of embodiments 32 to 57, wherein the electric drive powertrain controller is configured to operate the vehicle in accordance with the electric drive powertrain configuration to provide the battery system with a minimum state of charge (SoC) prior to the vehicle travelling over the portion of the route where the slip condition exists.

Embodiment 59. The method of embodiment 58, wherein the electric drive powertrain configuration for the vehicle based on the slip condition comprises the minimum SoC for the battery system that allows the vehicle to operate the electric drive powertrain in response to the vehicle experiencing a loss of traction over the portion of the route where the slip condition exists.

Embodiment 60. The method of any of embodiments 58 to 59, wherein the electric drive powertrain configuration for the vehicle based on the slip condition comprises the minimum SoC for the battery system that allows the vehicle to continuously operate the electric drive powertrain over the portion of the route where the slip condition exists.

Embodiment 61. The method of any of embodiments 32 to 60, further comprising: updating the electric drive powertrain configuration based on changes in the vehicle data, the external data, or a combination thereof.

Embodiment 62. The method of any of embodiments 32 to 61, further comprising: updating the electric drive powertrain configuration based on changes in the route of the vehicle.

4. Extensions and Improvements

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A system comprising:
a vehicle comprising a primary powertrain comprising a fuel-fed engine coupled to a primary drive axle; an electric drive powertrain comprising a battery system coupled to an electric drive axle; and an electric drive powertrain controller configured to collect vehicle data and control operation of the electric drive powertrain; and
a cloud computing system connected in wireless communication with the electric drive powertrain and one or more external data sources, wherein the cloud computing system is configured to receive the vehicle data from the electric drive powertrain controller; selectively receive external data from the one or more external data sources; determine whether a slip condition exists on a route of the vehicle based on the vehicle data, the external data, or a combination thereof and to predict a likelihood that the vehicle will slip or lose traction over the route; determine an electric drive powertrain configuration for the vehicle based on the slip condition; and communicate the electric drive powertrain configuration to the electric drive powertrain controller;
wherein the electric drive powertrain controller is configured to operate the electric drive powertrain in accordance with the electric drive powertrain configuration.

2. The system of claim 1, wherein the primary powertrain is configured to generate and provide motive torque to the primary drive axle to propel the vehicle over the route.

3. The system of claim 1, wherein the primary powertrain is independently operable from the electric drive powertrain to propel the vehicle over the route.

4. The system of claim 1, wherein the fuel-fed engine is coupled to the primary drive axle through a transmission.

5. The system of claim 1, wherein the fuel-fed engine is configured to burn compressed natural gas, diesel, hydrogen, liquified petroleum gas, or any combination thereof.

6. The system of claim 1, wherein the electric drive powertrain is configured to provide motive torque to the electric drive axle to propel the vehicle over the route.

7. The system of claim 1, wherein the electric drive powertrain is independently operable from the primary powertrain to propel the vehicle over the route.

8. The system of claim 1, wherein the battery system comprises one or more battery packs.

9. The system of claim 1, wherein the battery system is coupled to the electric drive axle through a motor/generator (M/G).

10. The system of claim 9, wherein the battery system is configured to selectively supply electrical power to the M/G to provide a motive torque to the electric drive axle to propel the vehicle over the route.

11. The system of claim 10, wherein the battery system is configured to selectively receive electrical power from the M/G in a regenerative braking mode and store the electrical power in one or more battery packs of the battery system.

12. The system of claim 1, wherein the electric drive powertrain controller is configured to collect the vehicle data from the vehicle, a primary system controller of the vehicle, user inputs through a user interface in the vehicle, or a combination thereof.

13. The system of claim 1, wherein the vehicle data comprises a location of the vehicle, a speed of the vehicle, load information of the vehicle, the route of the vehicle, one or more previous slip events of the vehicle, the vehicle data associated with the one or more previous slip events of the vehicle, a time of operation of the vehicle, a state of charge (SoC) of the battery system of the vehicle, a grade of road on which the vehicle is travelling, or a combination thereof.

14. The system of claim 1, wherein the electric drive powertrain controller is configured to communicate the vehicle data continuously to the cloud computing system.

15. The system of claim 1, wherein the electric drive powertrain controller is configured to selectively control an amount of electrical power supplied from the battery system to control operation of the electric drive powertrain.

16. The system of claim 1, wherein the external data comprises tire information of the vehicle, load information of the vehicle, previous slip data for the vehicle, previous slip data for other vehicles, previous slip data for other similar vehicles, a grade of each portion of the route of the vehicle, a grade of each portion of the route of the vehicle that exceeds a predetermined grade threshold, road conditions of the route of the vehicle, weather data associated with the route of the vehicle, or any combination thereof.

17. The system of claim 1, wherein the cloud computing system comprises a private external server configured to collect and store the vehicle data and the external data for a plurality of vehicles.

18. The system of claim 1, wherein the cloud computing system is configured to determine a slip condition exists when a condition or a combination of conditions in the vehicle data, the external data, or a combination thereof exists that increases a likelihood that the vehicle will slip or lose traction over the route.

19. The system of claim 1, wherein the cloud computing system is configured to determine a slip condition exists when a condition or a combination of conditions in the vehicle data, the external data, or a combination thereof exists that increases a likelihood that the vehicle may slip or lose traction over the route when the vehicle is propelled by the primary powertrain.

20. The system of claim 1, wherein the cloud computing system is configured to determine a slip condition exists when a condition or a combination of conditions in the vehicle data, the external data, or a combination thereof exists that increases a likelihood that the vehicle will require operation of the electric drive powertrain in conjunction with the primary powertrain to maintain traction of the vehicle over the route.

21. The system of claim 1, wherein the cloud computing system is configured to determine one or more locations along the route of the vehicle where the slip condition exists.

22. The system of claim 21, wherein the cloud computing system is configured to determine an electric drive powertrain configuration for the vehicle for each of the one or more locations.

23. The system of claim 1, wherein the electric drive powertrain configuration for the vehicle based on the slip condition comprises a minimum state of charge (SoC) for the battery system.

24. The system of claim 1, wherein the electric drive powertrain configuration for the vehicle based on the slip condition comprises a minimum state of charge (SoC) for the battery system prior to the vehicle travelling over a portion of the route where the slip condition exists.

25. The system of claim 1, wherein the electric drive powertrain configuration for the vehicle based on the slip condition comprises a minimum state of charge (SoC) for the battery system that ensures electrical power from the battery system is available to power the electric drive powertrain to provide traction assist to the primary powertrain over a portion of the route where the slip condition exists.

26. The system of claim 1, wherein the electric drive powertrain controller is configured to operate the vehicle in accordance with the electric drive powertrain configuration to provide the battery system with a minimum state of charge (SoC) prior to the vehicle travelling over a portion of the route where the slip condition exists.

27. The system of claim 26, wherein the minimum SoC for the battery system allows the vehicle to operate the electric drive powertrain in response to the vehicle experiencing a loss of traction over the portion of the route where the slip condition exists.

28. The system of claim 26, wherein the minimum SoC for the battery system allows the vehicle to continuously operate the electric drive powertrain over the portion of the route where the slip condition exists.

29. The system of claim 1, wherein the electric drive powertrain controller and the cloud computing system continuously communicate to update the electric drive powertrain configuration based on changes in the vehicle data, the external data, or a combination thereof.

30. The system of claim 1, wherein the electric drive powertrain controller and the cloud computing system continuously communicate to update the electric drive powertrain configuration based on changes in the route of the vehicle.

31. A method of operating a vehicle comprising a primary powertrain comprising a fuel-fed engine coupled to a primary drive axle, an electric drive powertrain comprising a battery system coupled to an electric drive axle, and an electric drive powertrain controller configured to control operation of the electric drive powertrain, comprising:

collecting vehicle data with the electric drive powertrain controller;

selectively receiving external data from one or more external data sources;

determining whether a slip condition exists on a route of the vehicle based on the vehicle data, the external data, or a combination thereof and predicting a likelihood that the vehicle will slip or lose traction over the route;

determining an electric drive powertrain configuration for the vehicle based on the slip condition prediction;

communicating the electric drive powertrain configuration to the electric drive powertrain controller; and operating the electric drive powertrain in accordance with the electric drive powertrain configuration.

32. The method of claim 31, wherein the primary powertrain is configured to generate and provide motive torque to the primary drive axle to propel the vehicle over the route.

33. The method of claim 31, wherein the primary powertrain is independently operable from the electric drive powertrain to propel the vehicle over the route.

34. The method of claim 31, wherein the fuel-fed engine is coupled to the primary drive axle through a transmission.

35. The method of claim 31, wherein the fuel-fed engine is configured to burn compressed natural gas, diesel, hydrogen, liquified petroleum gas, or any combination thereof.

36. The method of claim 31, wherein the electric drive powertrain is configured to provide motive torque to the electric drive axle to propel the vehicle over the route.

37. The method of claim 31, wherein the electric drive powertrain is independently operable from the primary powertrain to propel the vehicle over the route.

38. The method of claim 31, wherein the battery system comprises one or more battery packs.

39. The method of claim 31, wherein the battery system is coupled to the electric drive axle through a motor/generator (M/G).

40. The method of claim 39, wherein the battery system is configured to selectively supply electrical power to the M/G to provide a motive torque to the electric drive axle to propel the vehicle over the route.

41. The method of claim 40, wherein the battery system is configured to selectively receive electrical power from the M/G in a regenerative braking mode and store the electrical power in one or more battery packs of the battery system.

42. The method of claim 31, wherein the electric drive powertrain controller is configured to collect the vehicle data from the vehicle, a primary system controller of the vehicle, user inputs through a user interface in the vehicle, or a combination thereof.

43. The method of claim 31, wherein the vehicle data comprises a location of the vehicle, a speed of the vehicle, load information of the vehicle, the route of the vehicle, one or more previous slip events of the vehicle, the vehicle data associated with the one or more previous slip events of the vehicle, a time of operation of the vehicle, a state of charge (SoC) of the battery system of the vehicle, a grade of road on which the vehicle is travelling, or a combination thereof.

44. The method of claim 31, wherein the electric drive powertrain controller is configured to communicate the vehicle data to a cloud computing system.

45. The method of claim 31, wherein the electric drive powertrain controller is configured to selectively control an amount of electrical power supplied from the battery system to control operation of the electric drive powertrain.

46. The method of claim 31, wherein the external data comprises tire information of the vehicle, load information of the vehicle, previous slip data for the vehicle, previous slip data for other vehicles, previous slip data for other similar vehicles, a grade of each portion of the route of the vehicle, a grade of each portion of the route of the vehicle that exceeds a predetermined grade threshold, road conditions of the route of the vehicle, weather data associated with the route of the vehicle, or any combination thereof.

47. The method of claim 31, wherein a cloud computing system selectively receives the external data from the one or more external data sources.

48. The method of claim 31, wherein a slip condition exists when a condition or a combination of conditions in the vehicle data, the external data, or a combination thereof exists that increases a likelihood that the vehicle will slip or lose traction over the route.

49. The method of claim 31, wherein a slip condition exists when a condition or a combination of conditions in the vehicle data, the external data, or a combination thereof exists that increases a likelihood that the vehicle may slip or lose traction over the route when the vehicle is propelled by the primary powertrain.

50. The method of claim 31, wherein a slip condition exists when a condition or a combination of conditions in the vehicle data, the external data, or a combination thereof exists that increases a likelihood that the vehicle will require operation of the electric drive powertrain in conjunction with the primary powertrain to maintain traction of the vehicle over the route.

51. The method of claim 31, further comprising: determining one or more locations along the route of the vehicle where the slip condition exists.

52. The method of claim 51, further comprising: determining an electric drive powertrain configuration for the vehicle for each of the one or more locations.

53. The method of claim 31, wherein the electric drive powertrain configuration for the vehicle based on the slip condition comprises a minimum state of charge (SoC) for the battery system.

54. The method of claim 31, wherein the electric drive powertrain configuration for the vehicle based on the slip condition comprises a minimum state of charge (SoC) for the battery system prior to the vehicle travelling over a portion of the route where the slip condition exists.

55. The method of claim 31, wherein the electric drive powertrain configuration for the vehicle based on the slip condition comprises a minimum state of charge (SoC) for the battery system that ensures electrical power from the battery system is available to power the electric drive powertrain to provide traction assist to the primary powertrain over a portion of the route where the slip condition exists.

56. The method of claim 31, wherein the electric drive powertrain controller is configured to operate the vehicle in accordance with the electric drive powertrain configuration to provide the battery system with a minimum state of charge (SoC) prior to the vehicle travelling over a portion of the route where the slip condition exists.

57. The method of claim 56, wherein the electric drive powertrain configuration for the vehicle based on the slip condition comprises the minimum SoC for the battery system that allows the vehicle to operate the electric drive powertrain in response to the vehicle experiencing a loss of traction over the portion of the route where the slip condition exists.

58. The method of claim 56, wherein the electric drive powertrain configuration for the vehicle based on the slip condition comprises the minimum SoC for the battery system that allows the vehicle to continuously operate the electric drive powertrain over the portion of the route where the slip condition exists.

59. The method of claim 31, further comprising: updating the electric drive powertrain configuration based on changes in the vehicle data, the external data, or a combination thereof.

60. The method of claim 31, further comprising: updating the electric drive powertrain configuration based on changes in the route of the vehicle.

* * * * *